(12) United States Patent
Prittwitz (10) Patent No.: US 7,199,301 B2
(45) Date of Patent: Apr. 3, 2007

(54) FREELY SPECIFIABLE REAL-TIME CONTROL

(75) Inventor: Bernd Von Prittwitz, Seefeld (DE)

(73) Assignee: 3DConnexion GmbH, Seefeld (DE)

( * ) Notice: Subject to any disclaimer, the term of this patent is extended or adjusted under 35 U.S.C. 154(b) by 603 days.

(21) Appl. No.: 10/386,693

(22) Filed: Mar. 13, 2003

(65) Prior Publication Data

US 2004/0080507 A1  Apr. 29, 2004

Related U.S. Application Data

(63) Continuation of application No. PCT/EP01/09356, filed on Aug. 13, 2001.

(30) Foreign Application Priority Data

Sep. 13, 2000 (DE) ............................... 100 45 117

(51) Int. Cl.
*G10H 1/00* (2006.01)
(52) U.S. Cl. ......................... 84/615; 84/653; 84/678
(58) Field of Classification Search ................ 84/615, 84/626, 653, 658, 662, 670, 678
See application file for complete search history.

(56) References Cited

U.S. PATENT DOCUMENTS 4,600,919 A * 7/1986 Stern ......................... 345/473
4,763,531 A 8/1988 Dietrich et al. ............. 73/862
4,785,180 A 11/1988 Dietrich et al. ............. 250/231
5,630,017 A 5/1997 Gasper et al. .............. 395/2.85
5,717,848 A * 2/1998 Watanabe et al. .......... 345/474
5,757,360 A 5/1998 Nitta et al. ................. 345/156
6,011,212 A * 1/2000 Rigopulos et al. ........... 84/667

FOREIGN PATENT DOCUMENTS

| DE | 3611336 A1 | 10/1987 |
| EP | 0240023 | 8/1990 |
| EP | 0979990 A2 | 2/2000 |
| GB | 2188733 A | 10/1987 |

OTHER PUBLICATIONS

Jane Wilhelms, "Toward Automatic Motion Control", Apr. 1987, Bd. 7, No. 4, pp. 11-22, IEEE Computer Graphics and Applications, IEEE Inc.
Stefan Jockusch and Helge Ritter, "Synthetic Face Expressions Generated by Self Organizing Maps", Proceedings of the 1993 International Joint Conference on Neural Networks, Oct. 28, 1993, pp. 2077-2080.

* cited by examiner

*Primary Examiner*—Lincoln Donovan
*Assistant Examiner*—David S. Warren
(74) *Attorney, Agent, or Firm*—Fitzpatrick, Cella, Harper & Scinto (57) ABSTRACT

Systems, and related methods, for graphical visualization and real-time motion control of virtual or real objects for the purpose of generating or influencing image or tone sequences in real time by interactive control commands of a user.

10 Claims, 5 Drawing Sheets

FREELY SPECIFIABLE REAL-TIME CONTROL

CROSS REFERENCE TO RELATED APPLICATIONS

This is a Continuation of International Application of PCT/EP01/09356 filed Aug. 13, 2001, which in turn claims priority of German Application 100 45 117.9 filed Sep. 13, 2000, the priorities of which are hereby claimed, said International Application having been published in German, but not in English, as WO 02/23323 A2 on Mar. 21, 2002.

BACKGROUND AND FIELD OF APPLICATION OF THE INVENTION

The invention relates to a process for graphical visualisation and real-time control of virtual and/or real objects for the purpose of generating and/or influencing image sequences or tone sequences, with the aid of which objects represented on a screen or real objects, such as, for example, robots or such like, can be manipulated or controlled in their characteristics and/or actions in a convenient and reliable manner in (almost) real time by interactive control commands of a user. In particular, the present invention relates to a process for animation and motion control of a three-dimensional (real or virtual) articulated object in real time, to a process for freely specifiable control of animated graphics, video data or audio data with the aid of optical or acoustic parameters, to a computer-software product for executing such a process and also to a system for real-time motion control of virtual and/or real objects.

Let it be noted that "objects" in the sense of the invention may be virtual objects but may also be real objects such as robots or other remote-controlled objects having several degrees of freedom.

Within the scope of interactive communication between man and machine, problems frequently arise that are based on the inadequate adaptation of the machine to the characteristics of reception, processing and output of information by the human user. This mismatch may, on the one hand, result in a flood of information which can no longer be handled by the user, above all if several tasks have to be performed. On the other hand, too little demand on the user, for example in the case of a highly automated system in which the human is merely given a monitoring function, may have the effect that a falling-off in performance occurs as a result of the monotony of the working situation, and faults as a consequence of deficient drilling in the procedure in such situations are no longer overcome. Deficient consideration of the knowledge and level of training of the user of a machine should also be mentioned here. In many cases, human behaviour, for example in the selection, evaluation and linkage of information, in arriving at a decision, in problem-solving and also in the planning and execution of actions, is still only insufficiently taken into account and supported when it comes to the design of technical systems.

Although the systems that are currently used for the representation and control of objects in virtual environments take account in increasing measure of the capabilities of man for receiving and processing information, they have a major drawback: in connection with the input of control commands with a view to exerting a direct influence on the scene that is represented, the user is still reliant on conventional methods for the manual input of information, such as, for example, via a mouse, trackball, joystick, graphics tablet with pen or touch-screen. The input mechanisms that are necessary in this connection firstly have to be learnt by the user, in order to be capable of being executed also at an appropriate speed of reaction. On the other hand, the innate or acquired capabilities of man that are already present for communication by means of acoustic signals (e.g. speech) or optical signals (e.g. facial expressions, gestures, demeanours and movements) in connection with the input of information for the purpose of controlling objects are only insufficiently taken into account.

For the adaptation of technical systems to man, prior knowledge of his characteristics, his behavioural patterns, his skills and his level of knowledge is consequently necessary. In connection with the exchange of information between a user and an information system, the sensory, cognitive and motoric characteristics of man are of interest in particular.

With regard to the sensory characteristics of man which are predetermined by the sensory channels, essentially the following perceptive channels are addressed by conventional machines and devices for the output of information:

the visual channel (eyes) by means of optical signals,
the auditory channel (ears) by means of acoustic signals and
the tactile channel (sense of touch) by means of haptic signals.

After processing of the signals in the brain (cognition), with respect to the motoric characteristics of man which are predetermined by the output channels the following channels are essentially available:

the motor functions of the arms, hands and fingers, and of the legs and feet, and also movements of the body, head, eyes or mouth—that is to say, physical movements, demeanours, gestures and facial expressions for the purpose of generating mechanical or optical signals,
the motor functions of speech for the purpose of generating acoustic signals.

Via these channels, signals can be input into an information system in order to trigger a desired action of the system.

An ideal medium for communication between a user and an information system should be matched both to the sensory and perceptual capabilities and to the motoric capabilities and also to the specific characteristics of the human user. In this connection the information should be structured in such a way that an optimal correspondence is achieved between the representation of the output information and the mental model of the user: if the information to be displayed to the user is presented in such a way that, for example, his spatial perceptivity is addressed, the user can deal with astonishingly complex amounts of information per unit time. Similarly, the information system should be capable of receiving, understanding and processing as many types of information transmitted by a user as possible, and of transforming them into corresponding actions. Associated with this is the advantage that the user is able to react more efficiently and more quickly to new events and situations. User-friendliness and appropriateness to the task are consequently typical features which such an ideal communication medium is provided with. These features may be manifested as follows:

correspondence between type, volume and output speed and presentation of the output information with the sensory characteristics of the human user,
consideration of all the information channels of the user in connection with the reception, recognition and interpretation of received control signals of the user,
easy learnability and intuitive operability of the medium, high bandwidth of the transfer of information to the brain and high throughput of information, dynamic adaptation of the application to the individual characteristics, capabilities, tasks, working and organisational techniques of the user, use of a natural interactive language having high semantic content, reliability, robustness and maintainability of the medium, social acceptance of the medium in the population, consideration of health, ergonomic and safety-relevant aspects etc.

It is the aim of the development of suitable interfaces between man and machine to start from the characteristics of human communications channels and skills in order to make available devices, interactive techniques and interfaces that guarantee an effective reciprocal communication via these channels. So-called virtual realities (VR) are particularly suitable in order to attain this aim. The term "virtual reality" (VR) is understood to mean the computer-based generation of an intuitively perceptible or sensible scene consisting of its graphical representation and the interactive possibilities for the user. A virtual environment affords a user access to information which otherwise would not be available at the given location or at the given time. It is based on natural aspects of human perception, inasmuch as it employs visual information in three spatial dimensions. This information can, for example, be selectively changed or enhanced with further sensory stimuli. Essential preconditions in this connection are the monitoring of perspective in real time and the possibility of the active exertion of influence by the user of the system on the scene that is represented.

In the course of navigation through virtual environments the user can employ the type of control that is natural for him. This may be, for example, appropriate arm or leg movements, movements for positioning the head or eyes, rotary movements of the body or movements directed towards an object. Through the use of already existing skills of the user for the purpose of control, the cognitive loading during the interaction between man and machine can be reduced. As a result, the bandwidth of the communication between man and machine can be increased and the operability of the machine can be improved. Whereas in the case of the conventional forms of man/machine communication the control of the machine is undertaken in command-oriented manner, in the case of the control of objects in virtual environments no specific commands have to be freshly learnt and employed: the computer "observes" the user passively and reacts in appropriate manner to movements of the eyes, head and/or hands of the user under real-time conditions.

The manipulation of the characteristics and the influencing of the actions of objects of a scene that is represented presupposes a complicated interplay of sensor technology, cognitive processing and motor functions, on which many factors act (individual behavioural patterns and capabilities, experiences, environmental influences etc.). In the case of interactions in a virtual world, there are additional difficulties. For the control, manipulation and influencing of objects, in particular a reflex-type or cognitive sensory-motoric feedback is important which, for example, originates from receptors in the skin, kinaesthetic sensations, the sense of balance and also visual and/or acoustic sensations. In this connection, in many cases a necessary redundancy arises which does not always obtain in VR applications. By reason of the often insufficient sensory feedback in VR applications, in addition the learning of motoric skills is rendered difficult.

In the commercial VR applications a distinction is made between systems in which the user is completely integrated into the virtual environment ("immersion") and systems that offer only one "window" for virtual reality. In addition to the known forms of man/machine communication, such as direct manipulations of objects by manual delicate motoric operations (pointing, touching, grasping, moving, holding firmly etc.), formal interactive languages (programming languages, command languages and formal query languages), natural-language interaction, gesticulatory interaction by means of non-verbal symbolic commands (facial expressions, gestures, demeanours, movements) and also hybrid task-orientated forms of interaction, virtual realities can also be interpreted as a new form of man/machine communication. As the name "virtual reality" already suggests, for this purpose a certain fidelity to the reality of the presentation is necessary: the sensory information that is required for processing a task or for attaining an objective is to be presented to the user. Visual perception provides not only information about the location, movement, form, structure, contour, texture, colour or patterning of objects etc., but also information about the relative position of the body of the observer and the movements thereof and also about the nature of the three-dimensional environment. In this connection, synthetically generated environments can be fashioned more realistically if as much as possible of the information arising in natural environments (parallaxes due to movement, vanishing-points of the perspective representation, spatial depth effect and plasticity, illumination and casting of shadows, masking, brilliance effect, reflection effects and diffuse reflection etc.) is simulated. How much and which information is to be presented depends on the particular task that has been set. The differences between real and virtual worlds determine how realistic the simulation is perceived to be.

For the purpose of realising virtual realities, the visual information has to be simulated by a computer. In this connection, aspects similar to those in painting are relevant. In the case of the computer-assisted simulation of three-dimensional worlds, ordinarily the projection of individual beams of light is simulated. The starting-point of such a simulation is the specification of the environment to be simulated. To this end, the individual objects with their characteristics and their locations have to be established. For the purpose of visualisation, the intensities of individual image-points are then computed and projected onto the output medium.

With the aid of these simulations it is possible for totally new types of learning and drilling to be realised (examples: driving simulator or flight simulator); on the other hand, in this connection particular aspects of the real world are always abstracted. VR applications therefore simultaneously bring about an enhancement and a restriction of the possibilities for experience on the part of the user.

In principle, VR systems consist of sensors and actuators and also the coupling thereof. Important hardware constituents are, inter alia, the following:

Displays for presentation of the virtual environment: within the context of visual presentation, nowadays monitors, head-mounted displays (HMD), binocular omni-oriented monitors (BOOM) and projection systems find application above all; but use is also made of auditive or tactile displays which react to acoustic or manual user inputs.

Positioning and orientation systems for recording the location and perspective of the user: in this connection a distinction is made between the determination of the absolute position (position tracking) and the measurement of the deflection of articulations (angle measurement). Electromagnetic, kinematic, acoustic, optical and also image-processing procedures find application.

Interactive and manipulative systems for the action and reaction of the user in the virtual environment: for this purpose, use is made of pointing devices (2D or 3D mice, trackballs, joysticks etc.) or tactile devices (touch-screens, electromagnetic graphics tablets with pen etc.); so-called "data gloves" with deflection sensors and pressure sensors are also being employed to an increasing extent. Furthermore, voice control should also be mentioned in this context.

Computation systems and software for generating the virtual environment, subject to real-time requirements.

Networks for the integration of various users, by virtue of which new forms of collaboration may evolve.

The diverse technical variants of helmet-based or head-based systems for visualising virtual realities are designated synoptically in English as "visually coupled systems" (VCS). They consist of the following important components:

1. a display attached to the head or helmet,
2. a device for determining the movements of the head and/or eyes of the user,
3. a source of visual information, which depends on the direction of the head and/or vision of the user.

When a system of such a type is employed for VR applications, information from both the real environment and the virtual environment can be presented at the same time. In this connection one speaks of "see-through displays" for the presentation of enhanced realities.

The tracking of movements of the head is an important component of VR applications. Ordinarily the position and orientation of the head in space are ascertained; advanced systems can, in addition, track the direction of vision. To this end, most systems employ ultrasound, magnetic energy or light energy for communication between the transmitters fitted to the head and the receivers. Important technical data that play a role in the selection of these systems are:

the number of degrees of freedom for the directions of motion that can be registered and tracked,
the recordable angular range,
the static precision (sensitivity to vibration),
the resolution,
the reliability,
the throughput of data and the scanning-frequency of the screen,
the interface to the computer and also
further performance aspects.

VR applications can be used successfully in practice in a number of different fields. In the following, a number of possible applications will be outlined in exemplary manner.

Use in the training field: through learning to deal with (virtual) objects, interactive demonstrations, visualisation of abstract concepts, virtual training of behaviour in dangerous situations, virtual exploration of remote locations or epochs, knowledge can be imparted, creative skills can be taught, and behavioural patterns can be trained.

Use in driving training and flight training in appropriate simulators: behaviour, particularly in emergency situations, can be taught through the use of simulators.

Use in the field of computer games: through the possibility of navigation through a virtual scene and the possibility of selective control and influence on virtual objects, an impression arises that is close to reality, as a result of which the attractiveness of a computer game for the user can be substantially increased.

The technologies that are available nowadays for the input of information into a data-processing system can be divided into four groups, according to the sensors that are used:
1. mechanical input systems (e.g. keyboards, mice, trackballs and joysticks),
2. electrical input systems (e.g. tactile displays and graphics tablets),
3. optical input systems (e.g. light pens) and
4. acoustic input systems (e.g. voice-input and voice-interpretation systems).

In the following, the aids that are customary for the input of information according to the present-day state of the art and that are employed for the purpose of controlling objects in the field of VR applications will be briefly considered.

Conventional input systems, such as keyboards, mice, trackballs and joysticks, are in widespread use nowadays. They are used in order to control position-markers (cursors), mouse pointers etc., in order, for example, to be able to navigate through a virtual scene or to move virtual objects on the screen. The disadvantage of these input systems is that they require a surface to rest on (that is to say, a permanent location) in order to be able to be used efficiently.

With a touch-screen, on the other hand, it is possible to point with the finger directly to objects that are illustrated on the screen without requiring further space-consuming ancillary equipment on the desk. Low-resolution touch-screens have 10 to 50 positions in the horizontal and vertical directions and utilise horizontal and vertical series of infra-red light-emitting diodes and photoelectric sensors in order to build up a grid of invisible beams of light immediately in front of the screen. When the screen is touched, both vertical and horizontal beams of light are interrupted. From this information the current finger position can be ascertained.

Another known embodiment of touch-sensitive information-input devices is the capacitively coupled touch-panel. The latter provides a resolution of about 100 positions in each direction. If a user touches the conductively coated glass plate of the touch-screen with a finger, the current finger position can be ascertained by reason of the change in impedance. Other high-resolution panels make use of two transparent layers which are minimally spaced from one another. One of these layers is conductively coated; the other is coated with a resistive material. By virtue of the contact pressure of the finger, these two layers touch one another, and by measuring the drop in voltage resulting therefrom the current finger position can then be ascertained. A lower-resolution and cheaper variant of this technology uses a grid of fine wires instead of these layers.

According to the state of the art, nowadays various solutions to the problem of real-time motion control of virtual objects are available, each of these solutions being optimised for a special application. Certain limitations are therefore associated with each of these solutions. In order to be able to explain the rudiments of some of the most important of these solutions, it is necessary to consider briefly their most important aspects.

One possibility for real-time motion control of virtual or real objects has recently arisen by virtue of the fact that input devices for computers have become known that enable the simultaneous input of control signals having several mutually independent degrees of freedom. The possibilities that are created thereby exceed by far those which, for example, consist in the use of a mouse which can only be controlled in two dimensions (e.g. on the desktop). Although it is also known to provide a mouse with, for example, additional switches, these switches have the disadvantage that they do not enable the input of analogue data but are restricted to binary data (on/off).

Various input devices are also known from the state of the art that are able to generate analogue control signals having various mutually independent degrees of freedom, in which case each of these analogue signals can consequently be used as a parameter value of a controlling device. For example, from patent specification U.S. Pat. No. 5,757,360 an egg-shaped input device for computers is known which can be moved freely in space by a hand of the user, which ascertains its instantaneous positions, directions of motion, velocities and accelerations, and which transmits these kinematic data to the computer in wireless manner. In this case an analogue sequence of motions in the form of a motion pattern is identified, from which motion commands are derived and converted into an animated graphical representation. The motion patterns are recognised automatically with the aid of a pattern-recognition algorithm. In addition, control commands are generated. The disadvantage of this process consists in the fact that it is not freely specifiable, since sequences of motions of the user, which are recorded by the input device in analogue manner, are assigned to corresponding sequences of motions of stored motion sequences of an animated graphical representation and can only be represented as such.

Input devices that are provided with force/moment sensors to be operated manually are known, for example, from patent specifications DE 36 11 336 C2, DE 37 64 287 and also EP 0 979 990 A2. From the last-named patent specification it is known, moreover, to use a force/moment sensor of such a type for controlling a real or virtual mixing console or control console, for example in order to create and to fashion novel colour, light and/or sound compositions. In this case, once again the intuitive spatial control in three translatory and also three rotatory degrees of freedom can be transmitted in advantageous manner to a stage for continuously variable spatial mixing or control of a large number of optical and/or acoustic parameters.

Manually controllable input systems that permit navigation in three dimensions are nowadays employed successfully in a number of extremely diverse technical fields of application. One such field of application is constituted by, for example, control devices for controlling the functions of electronic musical instruments (above all, in the case of synthesisers and master keyboards) that are provided with a so-called MIDI interface (Musical Instrument Digital Interface).

Such a three-dimensional control device for electronic musical instruments is realised by, for example, the D-Beam controller which is integrated into the EM-30 and EM-50 keyboards manufactured by Roland. Through the use of an extremely sensitive beam of infrared light, in this case the movements of the hand and/or body of a user above a surface coated with infrared sensor elements can be detected in contact-free manner. By virtue of the D-Beam technology, individual acoustic parameters of recorded improvisations or compositions can be modified or controlled in real time by these movements of the hand and/or body of the user. To this end, the D-Beam controller converts the movements of the user into MIDI signals and analogue control signals.

Since one of the preferred exemplary embodiments of the present invention is likewise based on a control device for controlling stored parametrised audio data with the aid of parametrised control signals which, with the aid of controllable virtual objects, are transmitted to at least one electronic musical instrument via a MIDI interface, in the following the aspects of the MIDI standard that are important for an appreciation of the invention will be briefly presented.

The MIDI interface is a format for digital data transmission between electronic musical instruments, computers and peripheral devices. The MIDI standard is in widespread use nowadays and has been used by many musicians and composers since its introduction in 1983. MIDI reveals a very efficient method for presenting audio data, and this makes MIDI a very attractive data-transmission protocol not only for composers or artists but also for a large number of computer applications that are capable of generating sounds or sound patterns, such as multimedia applications or computer games, for example. Thanks to the publications of the General MIDI System Specification, nowadays the commonest PC/MIDI interfaces enjoy widespread acceptance amongst users. Furthermore, MIDI is supported by the Microsoft Windows operating system and by other operating systems. By reason of the development and marketing of inexpensive synthesisers, the MIDI standard is enjoying growing popularity, with a steadily increasing number of applications.

MIDI was originally developed in order to be able to couple two or more keyboards of different manufacturers to one another. However, at that time no-one foresaw that, with the aid of the MIDI data format, complete musical productions would be created by sequencer systems. Nowadays MIDI finds application, above all, as a transmission medium, in order to replace or to supplement digitised audio data in computer games or multimedia applications.

MIDI was standardised by the MIDI Manufacturers Association (MMA), to which all manufacturers of digital musical instruments throughout the world belong. This committee defines the standard that is binding on all members; inter alia, it also defines the command structure of the MIDI protocol which is laid down in the MIDI standard. Without this standard, incompatibilities would have arisen between the devices of different manufacturers.

In contrast with the transmission of analogue audio data, when sound patterns are transmitted from one or more keyboards to a computer (or in the opposite direction) via a MIDI interface merely bit sequences (so-called MIDI events) are transmitted which comprise, in electronically readable form, the significant acoustic parameters of the pieces of music that have been played on the individual keyboards or that are to be reproduced on them. These programming commands comprise MIDI sequences which, for example, instruct the synthesiser which soundtracks are to be recorded, which solo instruments or accompanying instruments are to be used for an arrangement, and which musical parameters are being transmitted. In detail, the expression "acoustic parameters" is to be understood to mean, for example, pitches, note-values or rest-values, loudness-levels, tempi, articulation instructions, timbres, pedal effects, vibrato effects, chorus effects, echo effects, overtone effects and/or other special effects. In the following these acoustic parameters will be designated as "MIDI playing information". When the audio data are reproduced on a keyboard it is accordingly a question not of analogue recordings of pieces of music previously recorded on a keyboard but of the exact reproduction of the recording event itself. The polyphonic voices of a reproduction synthesiser are at least partially assigned.

In comparison with the use of sampled audio data, which are stored on a diskette or on a CD-ROM, the generation of sounds or sound patterns with the aid of MIDI synthesisers has many advantages. One of these advantages concerns the memory space that is required for storage of the parametrised audio data. Files in which digitally sampled audio data are normally stored in a PCM format (such as, for example, ".WAV" files) are, as a rule, rather large. This is true, in particular, of long pieces of music that have been recorded in stereo quality with a high sampling-frequency. In contrast, MIDI files are extremely small. For example, files in which high-quality sampled audio data are stored in stereo quality contain about 10 Mbytes per minute of played-back music, whereas a typical MIDI sequence has a size of less than 10 kbytes per minute of played-back music. This is the case because MIDI files—as already mentioned—do not contain the samples audio data but merely contain the programming commands that are required by a synthesiser in order to generate the desired sound.

Since the MIDI playing information transports no direct information about the type of the audio data represented, individual acoustic parameters of this MIDI playing information are arbitrarily interchangeable retrospectively. This likewise affords great advantages:

A composer can retrospectively orchestrate or rearrange his work in variable manner.

The errors that have possibly arisen in the course of recording (e.g. "wrong notes") can be corrected retrospectively.

Several synthesisers can, for example, reproduce one and the same voice (unisono), in order to achieve more richness of sound and many other effects.

The additional possibility of editing recorded pieces of music on the screen, using one or more synthesisers or other electronic musical instruments—that is to say, of being able to change, supplement, delete, move or transpose individual notes or rests, groups of notes or entire staves—simplifies the work of a composer considerably.

A complete MIDI word consists, as a rule, of three bytes. Firstly the so-called status byte is transmitted; this is a communication about which type of message it is a question of. The status byte is followed by two data bytes, which contain data about the respective content of the message. The following example relates to the MIDI representation for the "switching on" of a note of medium pitch ($c^\cup$) which is to sound with medium loudness (Ital.: mezzoforte, mf):

|  | Type of message (status byte) | Pitch information (1st data byte) | Loudness information (2nd data byte) |
| --- | --- | --- | --- |
| MIDI word (binary) | $10010000_2$ | $00111100_2$ | $01000110_2$ |
| MIDI word (decimal) | $144_{10}$ | $60_{10}$ | $70_{10}$ |
| Musical information | "Note On" | Middle "C" ($c^\cup$) | "Mezzoforte" (mf) |

The first bit (most significant bit, MSB) in the binary representation of the status byte is always assigned the value "1"; in the case of data bytes, the MSB always has the value "0". In this way it is possible for status bytes and data bytes to be distinguished unambiguously. For the decimal values $Z_S$ for a status byte, as a consequence of the "1" in the MSB the following holds: $Z_S \in [128_{10}; 255_{10}]$. Since in the case of the data bytes the MSB is set to "0"—that is to say, it can no longer be drawn upon as a value indicator—only seven bits remain in each instance for the data bytes, so that for the decimal values $Z_{D1}$ and $Z_{D2}$ of the two data bytes the following consequently holds: $Z_{D1} \in [0_{10}; 127_{10}]$ and $Z_{D2} \in [0_{10}; 127_{10}]$. These 128 different "Note On" or "Note Off" combinations are fully sufficient, since 128 different pitches—arranged in an equally tempered, chromatic scale (i.e. spaced at semitone intervals)—far exceeds the tonal range (compass) of a modern concert grand piano with 88 keys.

In order to be able to address individual devices within a MIDI system selectively, there exist a total of 16 MIDI channels. The MIDI channel of the transmitter has to be identical with that of the respective receiver. In principle, it holds true in this connection that one MIDI data line transports all the playing information on all 16 MIDI channels, with the connected tone generators selecting the messages that are intended for them in the given case. With the aid of the last four bits of the status byte the address $A_k$ of a selected MIDI channel k (where $k \in \{0_{10}, \ldots, 15_{10}\}$ or $A_k \in \{0000_2, \ldots, 1111_2\}$) is transmitted. This means that only the first four bits of the status byte comprise the status information of a MIDI sequence (e.g. "Note On", "Note Off" etc.).

|  | 1st quartet of the status byte (status information) | 2nd quartet of the status byte (channel address) |
| --- | --- | --- |
| Type of message (status byte, binary) | $1001_2$ | $0000_2$ |
| Type of message (status byte, decimal) | $9_{10}$ | $0_{10}$ |

For the example of the "Note On" command described above, in concrete terms this means that the first channel (k=0) was selected with the address $A_0 = 0000_2$.

If a byte of such a MIDI word is received by a synthesiser, first of all a check is made on the basis of the MSB as to whether a status byte or a data byte is present. The receiver must furthermore check all status bytes with respect to their channel addressing that it, instructed by the respective MIDI-channel setting, has to receive. If a MIDI event with the address intended for it is discovered, the receiver decodes the data bytes following the status byte and generates the corresponding tones. This principle may be compared with the reading of a choir singer or an instrumentalist who, when singing or playing a piece of music, picks out only the voice intended for him from a polyphonic composition, an arrangement or a score.

In the following the functions of two of the commonest control devices to be encountered in synthesisers and master keyboards will be briefly described: the "pitch bend wheel" for continuously variable detuning of the pitches of tones of struck keys of a synthesiser, and the "modulation wheel" for modulation of the timbre properties of the pitches of tones of struck keys of a synthesiser.

The MIDI data format provides, by way of smallest possible interval between different pitches, equally tempered semitone steps or "chromas" (that is to say, enharmonically equivalent intervals, such as augmented unisons, minor seconds or doubly diminished thirds). In order to obtain a continuously variable frequency variation ("pitch bending"), so-called pitch-bend-wheel data are required which can be generated with a corresponding control instrument of the synthesiser (the pitch bend wheel). In this connection it is generally a question of a wheel or (more rarely) a joystick which can be moved in four directions. In the case of synthesisers that are equipped with these pitch bend wheels, it is possible for the pitches of the keys that are pressed down on the keyboard of the synthesiser to be detuned by a rotary motion of the pitch bend wheel in the direction of higher or lower frequencies. Detunings of up to an equally tempered whole tone in the direction of higher or lower frequencies can normally be generated by this means. The pitch bend wheel is, as a rule, equipped with a restoring mechanism which springs back again to the middle or normal position when the wheel is released. This position corresponds to the pitches of the keys pressed down when equally tempered tuning is taken as a basis.

With the aid of a modulation function, which ordinarily can be performed with another control instrument of the synthesiser (the modulation wheel), the tones of the keys struck on the keyboard of the synthesiser may optionally be provided with a vibrato effect. Alternatively, this control instrument may also be employed for the purpose of achieving other effects, for instance in order to modify the brilliance of the sound or the resonance of the tones played by virtue of an alteration to their overtone spectrum. If the modulation wheel is rotated as far as a first stop-point, the depth of effect is minimal; if it is rotated as far as an opposite, second stop-point, the depth of effect is maximal.

In order to be able to explain the control of individual MIDI functions with the aid of parametrised control signals, in the following the most important of the MIDI controllers that are necessary for this will be briefly discussed.

With the aid of the first data byte of a MIDI word, a maximum of 128 different controller addresses and hence up to 128 different playing aids or other MIDI functions can be addressed. The second data byte is responsible for the control range. For example, with the aid of controller No. 1, which is responsible for frequency modulations, a vibrato effect or tremolo effect can be added to the sounds generated by the synthesiser. In the following table the commonest controllers are listed with their numbers (addresses) and designations:

| Controller Number (decimal) | Controller Designation |
| --- | --- |
| 1 | Modulation |
| 2 | Breath Controller |
| 4 | Foot Controller |
| 5 | Portamento Time |
| 6 | Data-Entry Slider |
| 7 | Volume |
| 8 | Balance |
| 10 | Panorama |
| 11 | Expression Pedal |
| 12 to 31 | User-Defined |
| 91 | External-Effects Depth |
| 92 | Tremolo Depth |
| 93 | Chorus Depth |
| 94 | Detune Depth |
| 95 | Phaser Depth |

Addresses 12 to 31 are not assigned and offer the user opportunities for free assignments of MIDI functions. Depending on the nature of the respective synthesiser, occasionally very extraordinary physical parameters can be allocated to these addresses, for example oscillator frequency or pulse width of the generated oscillations.

Controllers 32 to 38 serve for resolving the range of values of controller addresses 1 to 6 more finely. The same is also brought about by the controllers numbered 39 to 63 for addresses 7 to 31.

The playing aids described hitherto are distinguished by a common characteristic: they can be controlled in continuously variable manner (in 128 or more individual steps). The generic term for these controllers is "continuous controllers". In contrast, other controllers exist that undertake switch functions and are therefore generally called "switch controllers". The following table gives an overview of the most important of these controllers:

| Controller Number (decimal) | Controller Designation |
| --- | --- |
| 64 | Sustain Pedal |
| 65 | Portamento Switch |
| 66 | Sostenuto |
| 67 | Soft Pedal |
| 69 | Hold-Pedal |
| 70 to 90 | undefined |
| 96 | Data Entry (−/No) |
| 97 | Data Entry (+/Yes) |

On closer inspection of the second data byte of Controller 64 only two words are to be found, namely 00000000$_2$ (=0$_{10}$) for "Pedal Off" and 11111111$_2$ (=127$_{10}$) for "Pedal On".

However, in principle the MIDI data format permits a differentiated interpretation of the range of values $1_{10}$ to $126_{10}$. For example, in this way a multi-level sustain effect can also be provided. In the case of synthesisers that permit this multi-level sustain effect, the decay phase of sound events with "half" depressed pedal is correspondingly shortened in comparison with the decay phase of sound events of the same pitch and loudness in the case of a pedal that has been depressed as far as the stop.

Normally the controller addresses, for example for the modulation wheel, the hold-pedal or swell boxes that can be operated with the foot for the purpose of influencing the dynamics, are already defined.

If one of these playing aids is being used, the controller address that is transmitted is fixed. Modern synthesisers and master keyboards, however, are also provided furthermore with freely definable controllers, i.e. an arbitrary controller-number can be allocated to the playing aids (pedals, swell boxes, wheels and sliding controls) provided for said controllers. Some tone generators permit, in turn, the redefinition of the controller functions in the device itself. In this connection the received controller-number can be freely allocated to an internal function.

For the purpose of generating sounds with the aid of electronic musical instruments, computers and sound cards, nowadays a large number of different technologies and processes are in use. Two widespread techniques for generating sounds with the aid of electronic musical instruments are frequency modulation (FM synthesis) and the use of wave tables (WAV synthesis).

FM synthesis is a process which is utilised by sound cards and computers in order to imitate the timbres of acoustic musical instruments by electronic means. Sounds generated with the aid of FM synthesis are easily recognisable as such—in contrast with sound patterns that have been generated by WAV synthesis with the aid of wave tables. Master keyboards and synthesisers that are provided with wave tables are relatively expensive but are often preferred by many professional and amateur musicians, on account of their high play-back quality. In this case the sound patterns are generated by wave tables which combine stored, digitally sampled original sounds (samples) of acoustic musical instruments with one another and/or reproduce them. Compared with FM synthesis, in which electronic sounds are generated with the aid of the computer, wave-table sound patterns consequently appear to be substantially more realistic.

With the aid of sound cards, the possibilities of conventional computers for generating audio signals and sound patterns can be extended. Sound cards are indispensable for any application that makes use of sound effects. In order to be able to translate analogue audio data into the digital computer language, sound cards are provided with appropriate devices for digitising analogue sounds. In this connection the generation of sounds by a sound card is based either on FM synthesis or on WAV synthesis.

OBJECT OF THE PRESENT INVENTION

Proceeding from the aforementioned state of the art, the present invention is dedicated to the object of making available convenient and reliably operating processes with the aid of which an active control of virtual and/or real objects is made possible for the user, whereby the already existing skills of the user are utilised for the purpose of transmitting information. In particular, the motion control of objects in real time and the real-time control of electronically generated audio signals are to be simplified.

This object is achieved, according to the invention, by virtue of the features of the independent claims. Advantageous exemplary embodiments, which develop the idea of the invention further, are defined in the dependent claims.

SYNOPTIC DESCRIPTION OF THE PRESENT INVENTION

With a view to achieving the object defined in the preceding section, the invention proposes an efficient process for graphical visualisation and real-time control of virtual or real objects for the purpose of generating and/or influencing image sequences and tone sequences, with the aid of which objects represented on a screen or real objects can be manipulated, controlled or influenced in their characteristics and/or actions in real time in a convenient and reliable manner by interactive control commands of a user. In particular, the present invention comprises a process for animation and motion control of an articulated object in (almost) real time, a process for freely specifiable control of optical and acoustic parameters, a computer-software product for executing such a process, and also a system for real-time motion control of virtual or real objects.

The present invention relates in particular to input devices that are able to generate control signals for various mutually independent degrees of freedom and that do this in each instance by virtue of analogue signals. Each of these analogue signals can consequently be used as a parameter value in connection with the control of virtual objects.

The technologies that are used in this connection for the input of the control commands transmitted by the user are, in contrast with conventional, manually operable, mechanical or touch-sensitive input mechanisms via a keyboard, mouse, trackball, joystick, graphics tablet with pen, tactile displays etc., devices for the reception, recognition, interpretation and processing of three-dimensional movements of a user. The user is consequently no longer reliant on the presence of additional hardware devices for the manual input of control commands. Evaluation of the input information may, instead or in addition, be undertaken with the aid of methods of signal recognition or pattern recognition. Furthermore, the type of the input process can be specially tailored to the individually existing capabilities of the user.

One aspect of the present invention is that reference patterns for the animation and motion control of objects, for the fashioning of shape, colour and structure of the surfaces of virtual objects, and also for generating and/or influencing image sequences and tone sequences are stored in advance. These reference patterns can then—in a manner depending on the control signals of the user—be retrieved in real time as parameter values for generating and/or influencing animation effects, for fashioning the surface of the objects, for the control or selective manipulation of video data and/or audio data etc. Saving of the respective reference patterns can be undertaken in this connection in standardised manner, so that, building upon such a real-time control, an amendment to the aforementioned parameter values can be undertaken with relatively little effort by a module-type exchange of the respective reference patterns at an appropriate interface of the real-time control system.

1. Process for Animation and Motion Control of an Articulated Object in Real Time by Control With the Aid of Parametrised Motion Patterns According to the underlying invention it is possible to dispense with a complete reprogramming of a real-time sequence of motions; rather, known motion patterns can be made available in parametrised form to a real-time motion-control system via a standardised interface.

A preferred exemplary embodiment of the underlying invention is based on a process for real-time motion control of an articulated object. In this case, first of all at least one parametrised motion pattern relating to at least one surface pattern for the object is defined. If control signals are then input into the real-time motion-control system with the aid of an input device, these skeletal amendment data (i.e. the changes of location of the contours of a virtual object or of a skeleton consisting of the points of articulation, connected by edges, of a virtual object) are computed as parameter values on the basis of the control signals and at least one parametrised pattern of motions. In this connection the skeletal amendment data reproduce translatory and/or rotatory amendments to the position and/or orientation of the articulations of the object. Finally, the surface of the virtual articulated object is computed on the basis of the skeletal amendment data and at least one surface pattern. By the last-mentioned steps being repeated in close succession, a motion control of the object is obtained (in a manner depending on the control signals of the user) that can no longer be distinguished by an observer from a motion control in real time.

By exchange or redefinition of a parametrised motion pattern and/or surface pattern, a motion control of a novel articulated object can accordingly be achieved with very little effort.

According to the exemplary embodiment of the underlying invention, control signals for at least six independent degrees of freedom can be input simultaneously and processed in real time. In this connection it is a question, for example, of control signals for three translatory and three rotatory degrees of freedom in a virtual three-dimensional vector space.

Proceeding from the instantaneous position vectors of the input device that have been ascertained, in accordance with the invention in particular the first and second time derivatives of the control signals (that is to say, the velocity, acceleration, angular-velocity and angular-acceleration vectors) can be ascertained and processed. The control system accordingly ascertains the temporal change in the control signals themselves, so that, for example in contrast with the patent specification U.S. Pat. No. 5,757,360 already mentioned, no separate acceleration sensor is required. Rather, the acceleration can be ascertained by temporal evaluation of the evolution of the control signals with the aid of the motion-control system itself. The assignment of the control signals or the time derivatives thereof as parameter values for the stored motion patterns may in this case be freely specifiable.

2. Process for Real-Time Control of Acoustic Parameters of Recorded Audio Data With the Aid of Parametrised Sound Patterns Furthermore or alternatively, in another exemplary embodiment of the underlying invention audio data can also be influenced selectively in real time with the aid of parametrised control signals of the user. In this case digitally stored, parametrised sound patterns, such as, for example, the acoustic parameters of digitally recorded (in accordance with the so-called MIDI standard) pieces of music, which are capable of being controlled via the parametrised control signals of the user, can be selectively modified. These sound patterns can then be retrieved—in a manner depending on the respective control signals of the user—in real time as parameter values.

3. Process for Freely Specifiable Control of Animated Graphics, Video Data and/or Audio Data According to another exemplary embodiment of the present invention, a process is provided for freely specifiable control of animated graphics, video data and/or audio data with the aid of optical and acoustic parameters. For the generation and/or influencing of these image sequences and tone sequences, in this case at least one predefined parametrised motion pattern, surface pattern, sound pattern and/or illumination pattern is saved by way of reference pattern. To this end, control signals having various degrees of freedom are evaluated by an input device and used as parameter values for the purpose of generating or influencing animated graphics, video data and/or audio data with the aid of at least one saved reference pattern. The assignment of the control signals each having one degree of freedom to a particular reference pattern is in this case freely specifiable by the user.

In addition, time derivatives of the control signals may optionally be assigned to a particular reference pattern. The coupling parameters of the assignment, such as, for example, the attenuation and the amplification, may in this case likewise by freely set by the user.

4. Computer-Software Product for Freely Specifiable Control of Animated Graphics, Video Data and/or Audio Data According to a further aspect of the present invention, a computer-software product is provided, with the aid of which a process according to one of the exemplary embodiments described above can be implemented.

5. System for Real-Time Motion Control of Virtual and/or Real Objects

In accordance with the invention, a system for real-time motion control of objects may also be provided that comprises a memory in which at least one parametrised motion pattern and at least one surface pattern of the object are saved. This system may, moreover, comprise an input device for the input of control signals for the real-time motion control. Furthermore, a motion generator may be provided, in order to compute skeletal amendment data on the basis of the control signals by way of parameter values and at least one parametrised motion pattern. In this connection the skeletal amendment data reproduce translatory and/or rotatory amendments to the position and/or orientation of the articulations of the object. In addition, a surface generator may be provided which computes the surface of virtual articulated objects on the basis of their skeletal amendment data and, in each case, a selected surface pattern.

The input device may be designed for simultaneous input of control signals for at least six independent degrees of freedom. It may, in particular, be conceived for the input of control signals for three translatory and three rotatory degrees of freedom in a three-dimensional vector space. In addition, a unit for ascertaining and processing the time derivatives of these control signals may also be provided.

In order to afford the user real-time control of stored audio data, furthermore a sound generator may be provided for generating sound signals by linkage of digital parametrised sound patterns with digital control signals which are present in parametrised form.

Moreover, a unit for optional assignment of the control signals or the derivatives thereof as parameter values for the parametrised motion patterns, surface patterns, sound patterns and/or illumination patterns may also be provided.

6. System for Freely Specifiable Real-Time Control of Animated Graphics, Video Sequences and/or Audio Sequences In another exemplary embodiment of the present invention a system for freely specifiable real-time control of animated graphics, video sequences and/or audio sequences is provided. In this case the system comprises a memory in which, for the purpose of generating and/or influencing animated graphics, video sequences and/or audio sequences in real time, at least one predefined parametrised motion pattern, surface pattern, sound pattern and/or illumination pattern is saved by way of reference pattern. The system comprises, moreover, an arithmetic unit for evaluating control signals having various degrees of freedom from an input device by way of parameter values for the purpose of generating and/or influencing animated graphics, video sequences and/or audio sequences with the aid of at least one saved reference pattern. Furthermore, a setting unit is also provided, in order to enable a freely selectable assignment of control signals each having one degree of freedom to a particular reference pattern. This setting unit may optionally enable the assignment of time derivatives of the control signals to a particular reference pattern. Furthermore, it may undertake a freely selectable setting of coupling parameters of the assignment, such as, for example, the temporal attenuation and the amplification.

The underlying invention is, as an average person skilled in the art who is active in this field can easily discern, not restricted only to the exemplary embodiments described above. Over and above the features disclosed therein, numerous modifications and variations are possible without substantially departing from the field of application of the present invention as disclosed in the Claims.

BRIEF DESCRIPTION OF THE DRAWINGS

Further characteristics, features, advantages and functionalities of the underlying invention result from the subordinate dependent claims and also from the following description of the preferred exemplary embodiments of the invention which are illustrated in the following drawings. Shown herein are:

DETAILED DESCRIPTION OF THE INVENTION

In the following the functions of the subassemblies contained in a first exemplary embodiment of the present invention, as illustrated in FIGS. 1 to 5, will be described in more detail.

Figure 1:
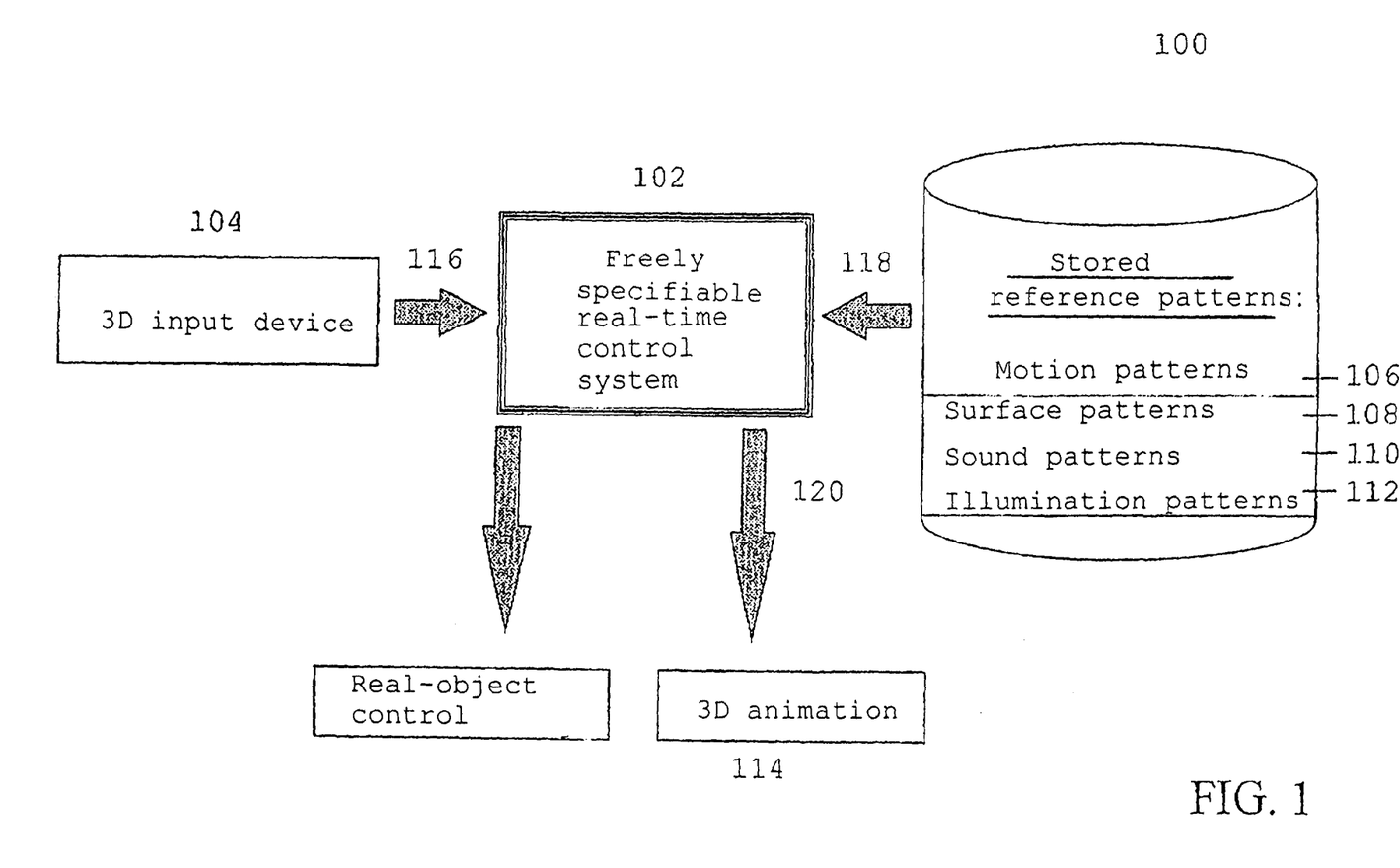
FIG. 1 a simplified block diagram for the purpose of illustrating the input and output signals of the freely specifiable real-time control system 102 for animated graphics, video sequences and/or audio sequences according to the preferred exemplary embodiment of the underlying invention, FIG. 2 a detailed block diagram for the purpose of illustrating the components and also the input and output signals of the freely specifiable real-time control system 102 for animated graphics, video sequences and/or audio sequences, FIG. 3 a flow chart for the purpose of illustrating the actions carried out by the freely specifiable real-time control system 102 for animated graphics, video sequences and/or audio sequences, FIG. 4 a block diagram for the purpose of illustrating the control of individual or several acoustic parameters of digitised sound patterns by a system consisting of a computer, the control unit 401 of which is conductively connected to at least one electronic musical instrument 402 via a MIDI interface, and a 3D input device 104 for the input of parametrised control signals for real-time motion control of virtual objects which can be represented on a screen and FIG. 5 a block diagram for the purpose of illustrating the control of individual or several acoustic parameters of digitised sound patterns by a system consisting of a computer, which is provided with an electronic tone generator 502 and a sound card 510, and a 3D input device 104 for the input of parametrised control signals for real-time motion control of virtual objects which can be represented on a screen.

Having reference to FIG. 1, the present invention will firstly be elucidated schematically. The man/machine interface is represented by the input device 104. This is, in particular, a so-called 3D input device which, for example, is able to generate control signals 116 for six mutually independent degrees of freedom if it is appropriately manipulated by a user. These degrees of freedom include, for example, three translatory degrees of freedom, which in the following are designated as x, y and z, and also three rotatory degrees of freedom, which in the following are designated as $\phi_x$, $\phi_y$ and $\phi_z$. In this connection the variables x, y and z designate the orthogonal axes of a three-dimensional Cartesian coordinate system. The latter can be described mathematically as a three-dimensional vector space V which is represented by an orthonormal basis consisting of the orthonormal unit vectors $\bar{e}_x$, $\bar{e}_y$ and $\bar{e}_z$. If these variables are summarised in vector notation, at each discrete time n the following arise (after omission of the units):

the position vector $\bar{x}(n):=[x(n),y(n),z(n)]^T \in \mathfrak{R}^3$ and
the direction-of-rotation vector
$\bar{\phi}(n):=[\phi_x(n),\phi_y(n),\phi_z(n)]^T \in \mathfrak{R}^3$.

The transformed position vector $\bar{x}_T(\bar{x},\Delta\bar{x})$, which arises after the translation of a point object P with the position vector $\bar{x}$ by the path differences $\Delta x$, $\Delta y$ and $\Delta z$ in the direction of the respective axes x, y and z, respectively, can be expressed in simple manner in this vector space V by addition of the position vector $\bar{x}$ and a linear combination of the orthonormal unit vectors $\bar{e}_x$, $\bar{e}_y$ and $\bar{e}_z$:

$$\bar{x}_T(\bar{x},\Delta\bar{x}):=\bar{x}+\Delta\bar{x} \text{ with } \Delta\bar{x}:=\Delta x \cdot \bar{e}_x + \Delta y \cdot \bar{e}_y + \Delta z \cdot \bar{e}_z \cdot \bar{e}_z \forall \Delta x, \Delta y, \Delta z \in \mathfrak{R}.$$

The variables $\phi_x$, $\phi_y$ and $\phi_z$ designate the directions of rotation of virtual objects about the x-, y- and z-axes, respectively, of this coordinate system. The transformed position vector $\bar{x}_R(\bar{x},\Delta\bar{\phi})$, which arises after the rotation of a point object P with the position vector $\bar{x}$ by the angles of rotation $\Delta\phi_x$, $\Delta\phi_y$ and $\Delta\phi_z$, respectively, can be expressed in this vector space V as follows:

$$\bar{x}_R(\bar{x},\Delta\phi_x,\Delta\phi_y,\Delta\phi_z):=\tilde{R}_z(\Delta\phi_z)\cdot\tilde{R}_y(\Delta\phi_y)\cdot\tilde{R}_x(\Delta\phi_x)\cdot\bar{x} \text{ with } \Delta\bar{\phi}:=[\Delta\phi^x,\Delta\phi_y,\Delta\phi_z]^T \forall \Delta\phi_x,\Delta\phi_y,\Delta\phi_z \in \mathfrak{R},$$

the rotation matrices $\tilde{R}_x(\Delta\phi_x)$, $\tilde{R}_y(\Delta\phi_y)$ and $\tilde{R}_z(\Delta\phi_z)$ being defined as follows:

$$\tilde{R}_x(\Delta\varphi_x) := \begin{pmatrix} 1 & 0 & 0 \\ 0 & \cos(\Delta\varphi_x) & -\sin(\Delta\varphi_x) \\ 0 & \sin(\Delta\varphi_x) & \cos(\Delta\varphi_x) \end{pmatrix},$$

$$\tilde{R}_y(\Delta\varphi_y) := \begin{pmatrix} \cos(\Delta\varphi_y) & 0 & \sin(\Delta\varphi_y) \\ 0 & 1 & 0 \\ -\sin(\Delta\varphi_y) & 0 & \cos(\Delta\varphi_y) \end{pmatrix} \text{ and}$$

$$\tilde{R}_z(\Delta\varphi_z) := \begin{pmatrix} \cos(\Delta\varphi_z) & -\sin(\Delta\varphi_z) & 0 \\ \sin(\Delta\varphi_z) & \cos(\Delta\varphi_z) & 0 \\ 0 & 0 & 1 \end{pmatrix}.$$

Of course, with the aid of key controls or switches, for example, further degrees of freedom can be added relatively simply. In this connection it is to be noted that, as a rule, switches or keys generate binary control signals (On/Off), whereas the aforementioned three translatory degrees of freedom x, y and z and the three rotatory degrees of freedom $\phi_x$, $\phi_y$ and $\phi_z$ may each result in analogue control signals which then, for example in the case of byte-serial coding on $2^8=256$ levels, are available as digital signals for further processing.

Since the three translatory and the three rotatory degrees of freedom x, y, z, $\phi_x$, $\phi_y$ and $\phi_z$ are to be interpreted as "analogue signals" or digitised signals quantised on 256 levels, according to the present invention the temporal change in these control signals 116 can also be evaluated by the freely specifiable real-time control system 102, which is described in more detail further below, for animated graphics, video sequences and/or audio sequences. In particular, it is accordingly possible to record at each discrete time n (after omission of the units) the three-dimensional vectors for the velocity $\bar{v}(n):=[\dot{x}(n),\dot{y}(n),\dot{z}(n)]^T \in \mathfrak{R}^3$, the acceleration $\bar{a}(n):=[\ddot{x}(n),\ddot{y}(n),\ddot{z}(n)]^T \in \mathfrak{R}^3$, the angular velocity $\bar{\omega}(n):=[\dot{\phi}_x(n),\dot{\phi}_y(n),\dot{\phi}_z(n)]^T \in \mathfrak{R}^3$, and also the angular acceleration $\bar{\alpha}(n):=$
$[\ddot{\phi}(n),\ddot{\phi}_y(n),\ddot{\phi}_z(n)]^T \in \mathfrak{R}^3$ having degrees of freedom x, y, z, $\phi_x$, $\phi_y$ and $\phi_z$ and optionally to evaluate them as further degrees of freedom independently of the absolute value of the respective control signals 116. In this connection no further sensors (e.g. velocity sensors or acceleration sensors) are necessary on the part of the input device 104.

Accordingly, whereas on the input side the control signals 116 are supplied from the 3D input device 104 to the freely specifiable real-time control system 102 for animated graphics, video sequences and/or audio sequences according to the present invention, said real-time control system outputs, in a manner depending on these control signals 116, animation output signals 120, with the aid of which a 3D animation 114 can be generated, for example on the screen of a computer. This 3D animation 114 may include the following:

- controllable motion patterns 106 of at least one movable articulated body,
- controllable surface patterns 108 of the articulated body and/or its environment,
- controllable sound patterns 110 and/or
- controllable illumination patterns 112 for the articulated body and/or its environment.

In this connection it should be pointed out that the generation of this 3D animation 114 with respect to the control signals 116 is carried out in real time. Accordingly, in contrast with many known examples according to the state of the art, it is normally not necessary to store tone sequences or image sequences in advance, in order then to trigger them on the press of a button.

It is a great advantage of the present invention that for a 3D animation 114 which is to be newly generated a completely new programming, as is the case according to the state of the art, does not have to be undertaken. Rather, stored motion patterns 106, surface patterns 108, sound patterns 110 and/or illumination patterns 112 can be connected in the manner of an interface to the freely specifiable real-time control system 102 for animated graphics, video sequences and/or audio sequences. By exchange or renewed specification of at least one of the aforementioned patterns, a totally novel 3D animation 114 can be generated in simple manner. The programming effort for the purpose of creating a new 3D animation 114 is consequently distinctly reduced.

Since in various animal genera, and also in man, in the course of evolution the brain has become able to process extremely complex amounts of information per unit time with regard to the spatial perception and processing of patterns of motion, in a preferred exemplary embodiment of the underlying invention these learnt and inherited capabilities are fallen back on in simple manner, in that known motion patterns are made available in module-like manner via a standardised interface of the freely specifiable real-time control system 102 for animated graphics, video sequences and/or audio sequences.

It is to be noted that the 3D input device 104 only represents one example of an input device for generating control signals 116. In principle, any other type of input device is also suitable, but the 3D input device 104 has the great advantage that the input of control signals 116 having variable degrees of freedom can be undertaken in particularly intuitive manner. With regard to the concrete embodiments of such 3D input devices 104, reference is made to the state of the art cited in the introduction to this description. Products of such a type are commercially available, for example from LogiCad3D.

Figure 2:
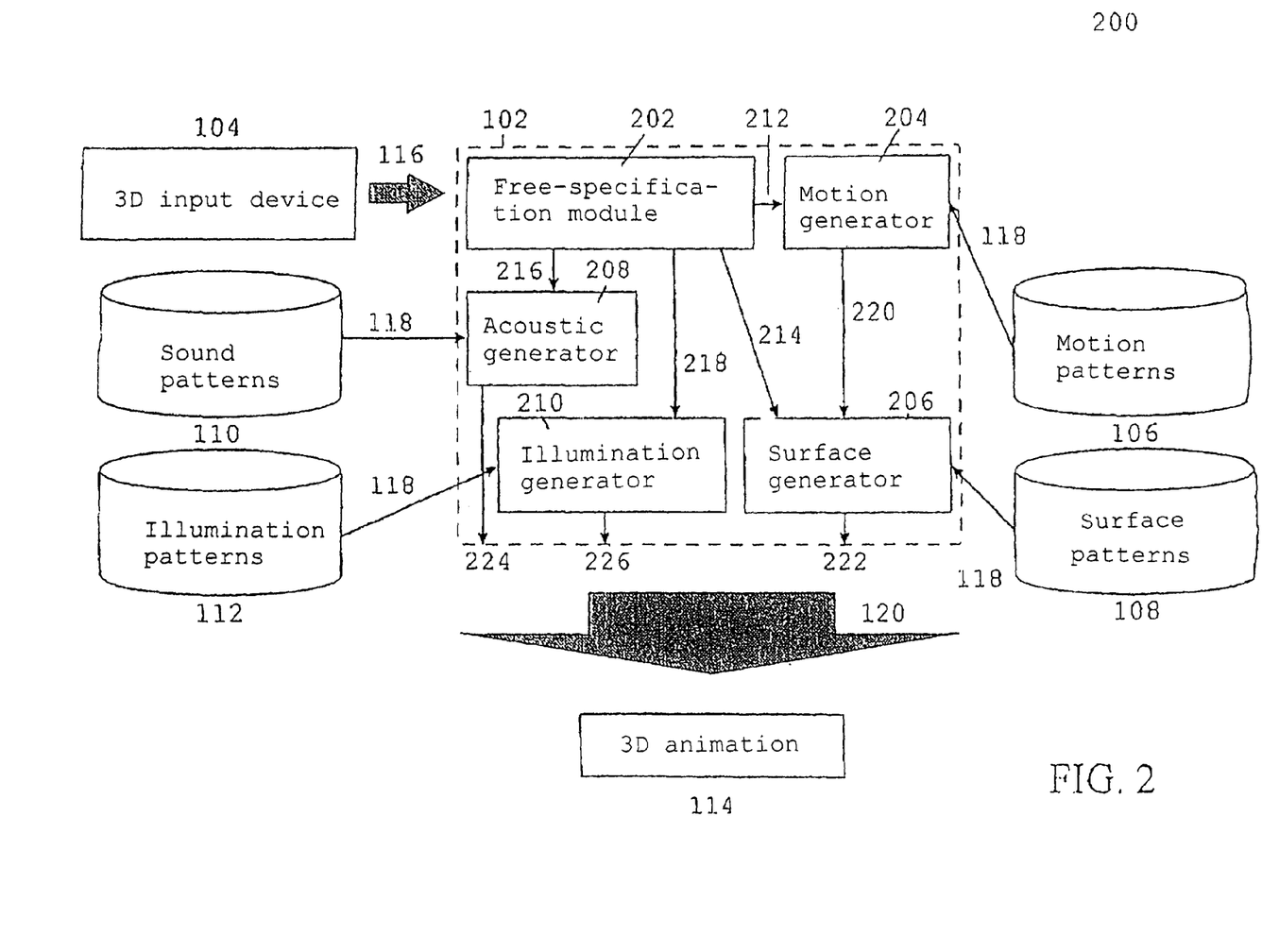

Having reference to FIG. 2, the structure of the freely specifiable real-time control system 102 according to the invention for animated graphics, video sequences and/or audio sequences will now be elucidated in detail. The arrows 116 and 120 shaded in grey show the input and output, respectively, proceeding in real time, of signals to and from, respectively, the freely specifiable real-time control system 102, namely the control signals 116 (x, y, z, $\phi_x$, $\phi_y$ and $\phi_z$) from the 3D input device 104, and the animation output data 120.

As is evident from FIG. 2, the control signals 116 are supplied to a free-specification module 202. One function of the free-specification module 202 is to ascertain from the absolute values of the input "analogue data" x, y, z, $\phi_x$, $\phi_y$ and $\phi_z$ the first time derivatives (velocities and angular velocities) and the second time derivatives (accelerations and angular accelerations). Consequently, without the assistance of an additional sensor (acceleration sensor), the velocity and the acceleration, for example, in respect of the stated "analogue data" among the control signals 116 can be ascertained.

A second important function of the free-specification module 202 is to assign the control signals 116 having the various degrees of freedom to the components for generating and/or influencing the graphics, image sequences and tone sequences—that is to say, to the motion generator 204, to the surface generator 206, to the acoustic generator 208 and to the illumination generator 210. Accordingly, for example, in the course of the initialisation of the real-time control system 102 according to the invention for animated graphics, video sequences and/or audio sequences a mask may be provided for the user which affords the user access to the free-specification module 202 in such a way that the user can assign one degree of freedom, in each instance, of the control signals 116 to one of the aforementioned components for generating and/or influencing the graphics, image sequences and tone sequences.

Furthermore, with the aid of this free-specification module 202 the user can freely set the coupling parameters of the assignment of control signals to stored reference patterns, such as, for example, for the purpose of carrying out a spectral filtration with a view to attenuating or amplifying the signal components of audio signals within predeterminable frequency ranges. In this connection the settable coupling parameters establish the temporal coupling and also the attenuation or amplification of the change in the corresponding reference pattern in a manner depending on the allocated control signal and consequently establish the signal-response behaviour of the system. Depending on the specification by the user, the free-specification module 202 accordingly has the effect that the coupling parameters of the assignment—such as, for example, the attenuation or amplification—can be freely set. If, for example, the coupling parameters with respect to the motion pattern of a walking movement of the articulated object are changed, a change-over can be made in continuously variable manner from a dynamic walking movement to a limping walking movement. In accordance with the invention, various moods or emotions, expressed by the facial expression of a face which is represented, can likewise be set by this means. In this connection the motion patterns may be coupled with the mood patterns as follows:

| Motion Pattern (Parameter #1) | Character Figure Represented | Mood Pattern (Parameter #2) | Facial Expression Represented |
|---|---|---|---|
| dynamic gait, rapid movements | young athlete | jolly, full of life | smiling, winking, etc. |
| limping gait, | old man | sad, melancholy | drooping |

-continued

| Motion Pattern (Parameter #1) | Character Figure Represented | Mood Pattern (Parameter #2) | Facial Expression Represented |
|---|---|---|---|
| slow and cautious movements | | | corners of the mouth, frowns, etc. |

The user can accordingly select in continuously variable manner between the walking movement of a young athlete and that of an old man and, coupled thereto, can select various characters and/or moods in simple manner.

In the sense of a higher-value assignment it is also possible, instead of the setting of individual coupling parameters, to call up the character (young/old etc.) and/or the mood (jolly/sad etc.) only in the course of the specification, in which case the free-specification module 202 then automatically sets the individual coupling parameters (for example, for the gait, the face etc.). Instead of the setting of individual coupling parameters, this higher-value (linked) assignment accordingly enables the choice of a character and/or mood. The choice of the mood may in this connection have an influence on various patterns, so that, for example, at the same time the scoring, the illumination of the scene and the movement are changed. Accordingly, both several coupling parameters of one pattern and several coupling parameters of various patterns (motion, surface, image and/or sound) can be changed automatically by an action of the user. Consequently choreographies can be created that make use of a real-time control of a character figure and of the background.

Depending on the specification by the user, the free-specification module 202 assigns the corresponding control signals 116 as follows:
  as parametrised motion control signals 212, to a motion generator 204,
  as parametrised surface control signals 214, to a surface generator 206,
  as parametrised acoustic control signals 216, to an acoustic generator 208 and/or
  as parametrised illumination control signals 218, to an illumination generator 210.

The motion generator 204 links the motion control signals 212 allocated to it with at least one predefined parametrised motion pattern 106 for the purpose of generating motion animation output signals 220. Consequently various motion patterns of the virtual articulated object (e.g. walking in different directions, stooping or jumping etc.) can accordingly be controlled in real time.

The surface generator 206 links the surface control signals 214 allocated to it, the motion animation output signals 220 generated by the motion generator 204 and also data from at least one predetermined parametrised surface pattern 108 for the purpose of generating surface output signals 222. Consequently, for example, an amendment to the structure, colour, colour saturation or brightness of particular areas of a moving object and/or of its environment can be introduced.

The acoustic generator 208 links the acoustic control signals 216 assigned to it with at least one parametrised predefined sound pattern 110. The product of this linkage is constituted by the sound output signals 224 which represent a fraction of the animation output signals 120. The stored sound patterns may, for example, be parametrised digital audio files.

In corresponding manner the illumination generator 210 links the illumination control signals 218 allocated to it with at least one predefined parametrised illumination pattern 112 for the purpose of generating illumination output signals 226. The illumination pattern 112 may in this connection relate to a virtual object and/or its environment.

As already stated, the predefined motion patterns 106, surface patterns 108, sound patterns 110 and illumination patterns 112 are each parametrised, so that the corresponding assigned control signals can be used as parameter values by the motion generator 204, the surface generator 206, the acoustic generator 208 and the illumination generator 210, respectively, in order to execute a real-time control of the corresponding patterns in a manner depending on the control signals 116, whereby the real-time control of the corresponding patterns is reflected in the corresponding change in the generated animation data 220, 222, 224 and 226 which are combined overall to form the animation output signals 120.

The user can accordingly, by appropriate manipulation of the input device 104 and of the corresponding assignment by the free-specification module 202 (which has been set by the user himself, or in advance by the manufacturer), control the motion patterns 106, the surface patterns (geometries, textures, etc.) 108, the sound patterns 110 and/or the illumination patterns 112 in real time. In this connection he can, on the one hand, trigger predefined patterns, to which end, for example, use may be made of a switch on the input device 104. On the other hand, by using the "analogue control signals" x, y, z, $\phi_x$, $\phi_y$ and $\phi_z$ he can execute a real-time control of the stated patterns.

The function of the generators 204, 206, 208 and 210 will be elucidated in detail on the basis of the motion generator 204:

It is assumed that in the course of the animation an articulated body is to be controlled in real time. Accordingly, in this case the motion generator 204 constantly computes, in a manner depending on the motion control signals 212, the new position and orientation of the articulations of the articulated body.

A motion pattern 106 is accordingly defined, for example, as follows: firstly skeletal data are defined which describe the type and location of the articulations of the articulated body. In addition to the location of the articulations (position), the type of the articulations (describable by type and number of the degrees of freedom) is also defined. For each articulation j of the J articulations of a virtual articulated object under consideration, the following string $S_j$, for example, can be defined:

$S_j := \{\text{Name}_j, \text{Position}_j, \text{Degrees\_of\_freedom}_j, \text{Maximum\_amplitude}_j, \text{Attenuation}_j, \ldots \}$ for $1 \leq j \leq J$ A sequence of motions then accordingly consists of a list or of a function which establishes which of the defined articulations moves in a manner depending on the parametrised control signals, when, and how. A sequence of motions may consequently exist, for example, by virtue of a list of the articulations "to be processed". For each cycle, by processing the list or a function a computation is accordingly carried out as to which new position and/or orientation of the articulations results, in a manner depending on the control signals, from the individual contributions of the various articulations.

At a time n the position of an articulation, defined by the coordinates x, y, z, and also the orientation thereof, defined by the angular coordinates $\phi_x$, $\phi_y$ and $\phi_z$, is accordingly computed as follows:

$$\begin{pmatrix} x \\ y \\ z \\ \varphi_x \\ \varphi_y \\ \varphi_z \end{pmatrix}_n := \begin{pmatrix} x \\ y \\ z \\ \varphi_x \\ \varphi_y \\ \varphi_z \end{pmatrix}_{n-1} + \sum_{j=1}^{J} \begin{pmatrix} \Delta xj \\ \Delta yj \\ \Delta zj \\ \Delta \varphi_{x,j} \\ \Delta \varphi_{y,j} \\ \Delta \varphi_{z,j} \end{pmatrix} \quad (1)$$

This equation (1) is accordingly computed for each articulation defined in the skeletal data. The new position and orientation of an articulation at time n are consequently computed from the position in the preceding cycle n−1 with the addition of the new contributions which are dependent on the control signals $\Delta x_j, \Delta y_j, \Delta z_j, \Delta \phi_{x,j}, \Delta \phi_{y,j}$ and $\Delta \phi_{z,j}$.

Each articulation j consequently provides an amendment contribution for the position and orientation of each articulation, including itself.

The contributions of each articulation j to the shift in the position or orientation of every other articulation and also of the same articulation are calculated by the following formula:

$$[\Delta x_j, \Delta y_j, \Delta z_j, \Delta \phi_{x,j}, \Delta \phi_{y,j}, \Delta \phi_{z,j}]^T := f_j(x,y,z,\phi_x,\phi_y,\phi_z,\dot{x},\dot{y},\dot{z},$$
$$\phi_x,\phi_y,\phi_z,\ddot{x},\ddot{y},\ddot{z},\ddot{\phi}_x,\ddot{\phi}_y,\ddot{\phi}_z) \quad (2)$$

with $f_j: \mathfrak{R}^{18} \to \mathfrak{R}^6 \forall j \in \{1,2,3,\ldots,J\}$.

The vector-valued function $f_j$ constitutes a representation of how a particular sequence of motions, for example the gait of a man, can be reproduced in standardised manner.

Figure 3:
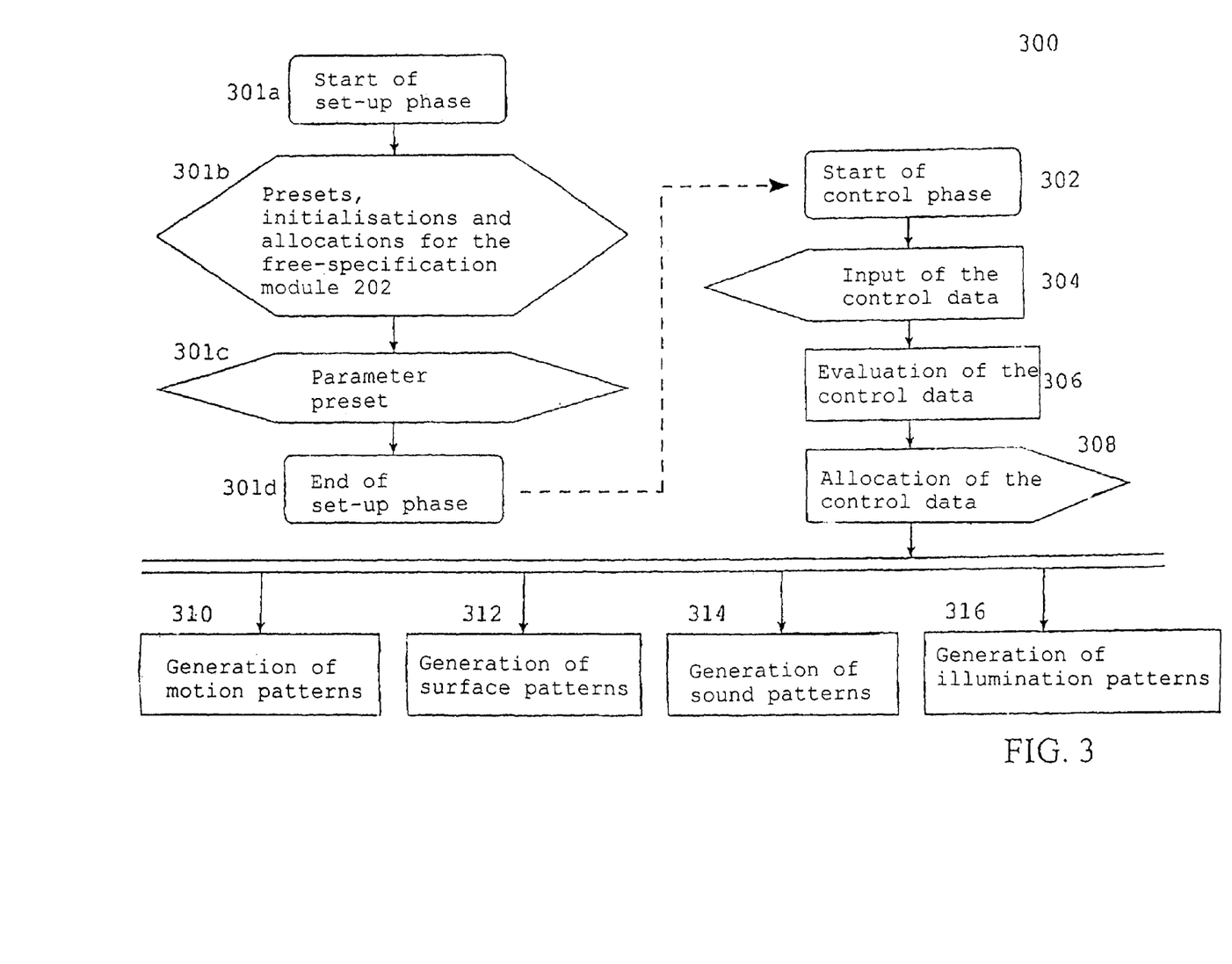

Having reference to the flow chart of FIG. 3, the sequence according to the present invention will now finally be elucidated once again. Steps 301a, 301b and 301c relate to a setting and allocating operation in the free-specification module 202. This operation may be established either by the user or in advance. After the start in step 301a, the user and/or a programmer can accordingly allocate the individual control signals 116 having the various degrees of freedom to various patterns (motion patterns 106, surface patterns 108, sound patterns 110 and/or illumination patterns 112) by means of the free-specification module 202. In a step 301c the coupling parameters between the control signals and the amendments to the corresponding patterns that have actually been executed in real time can then be set. These coupling parameters may, for example, relate to the attenuation and the amplification of sound patterns.

In connection with the start of a real-time animation in step 302, in a step 304 the control signals are then passed from the 3D input device 104 to the real-time control system 102 for animated graphics, video sequences and/or audio sequences. In a step 306 the control signals are then evaluated, whereby, for example, the first and second time derivatives of the "analogue control signals" are ascertained. Finally, in a step 308 an allocation of the control signals having the various degrees of freedom to the motion patterns 106, surface patterns 108, sound patterns 110 and/or illumination patterns 112 already mentioned above is carried out.

With regard to the illumination pattern 112, it is to be noted that both the illumination situation for an animated articulated object itself and the illumination of the background or of various scenes can be changed in real time by appropriate assignment and input of appropriate control signals 116.

Figure 4:
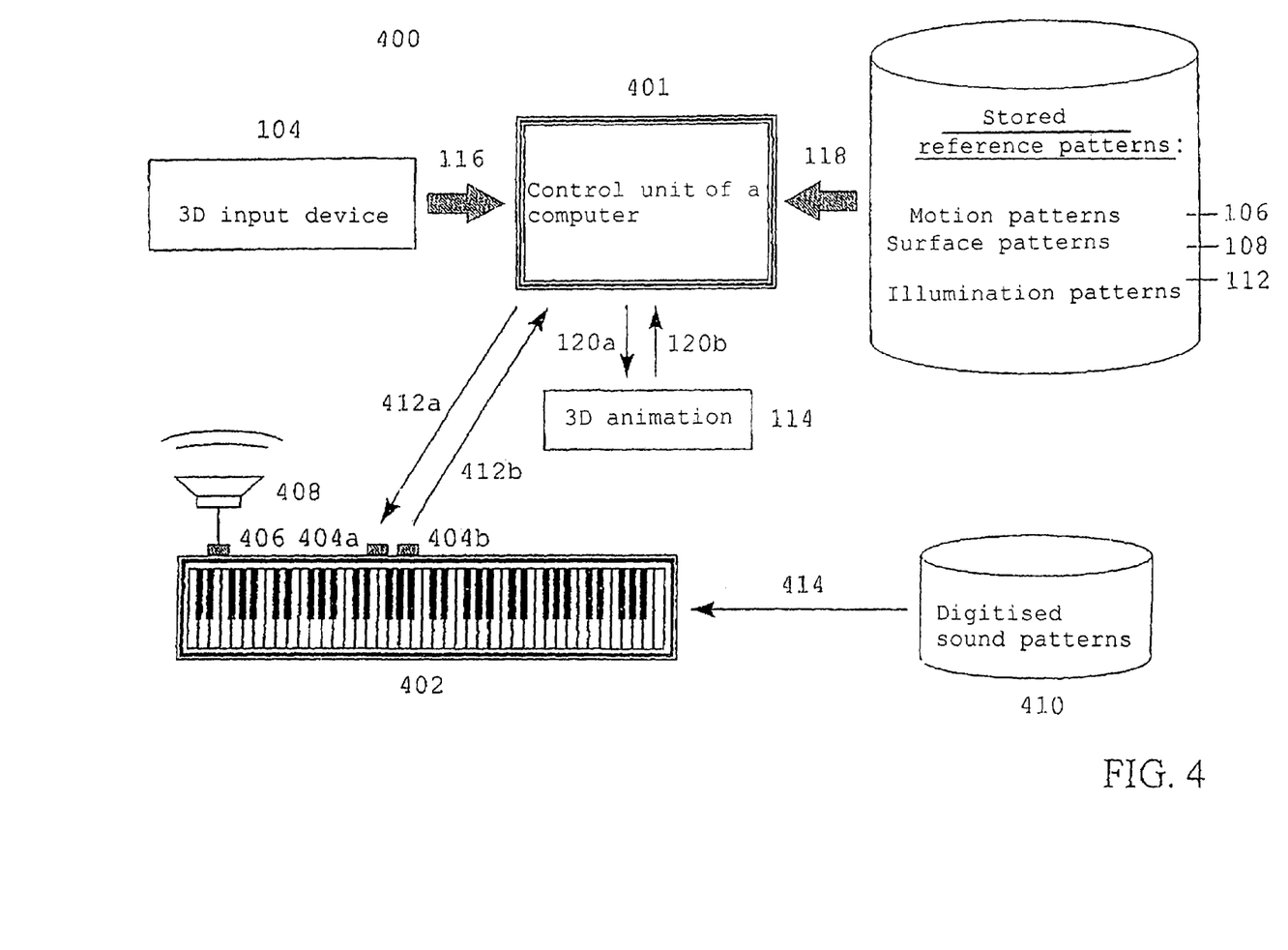

Having reference to the exemplary embodiment of the underlying invention represented schematically in FIG. 4, with a view to controlling individual or several acoustic parameters of digitised sound patterns 410 a process or a system may be provided which uses the following devices:
a computer, the control unit 401 of which is conductively connected to at least one electronic musical instrument 402 via a MIDI interface 404a+b and
an input device 104 for the input of parametrised control signals 116 for real-time motion control of virtual objects which can be represented on a screen.

In this connection the digitised sound patterns 410 can be stored digitally in accordance with the MIDI standard in the memory of at least one electronic musical instrument 402 and can be generated or played back in accordance with the MIDI standard on at least one electronic musical instrument 402. Individual or several of these acoustic parameters may, according to the invention, be generated or influenced in real time by means of control of the virtual objects by a movement of the input device 104.

Figure 5:
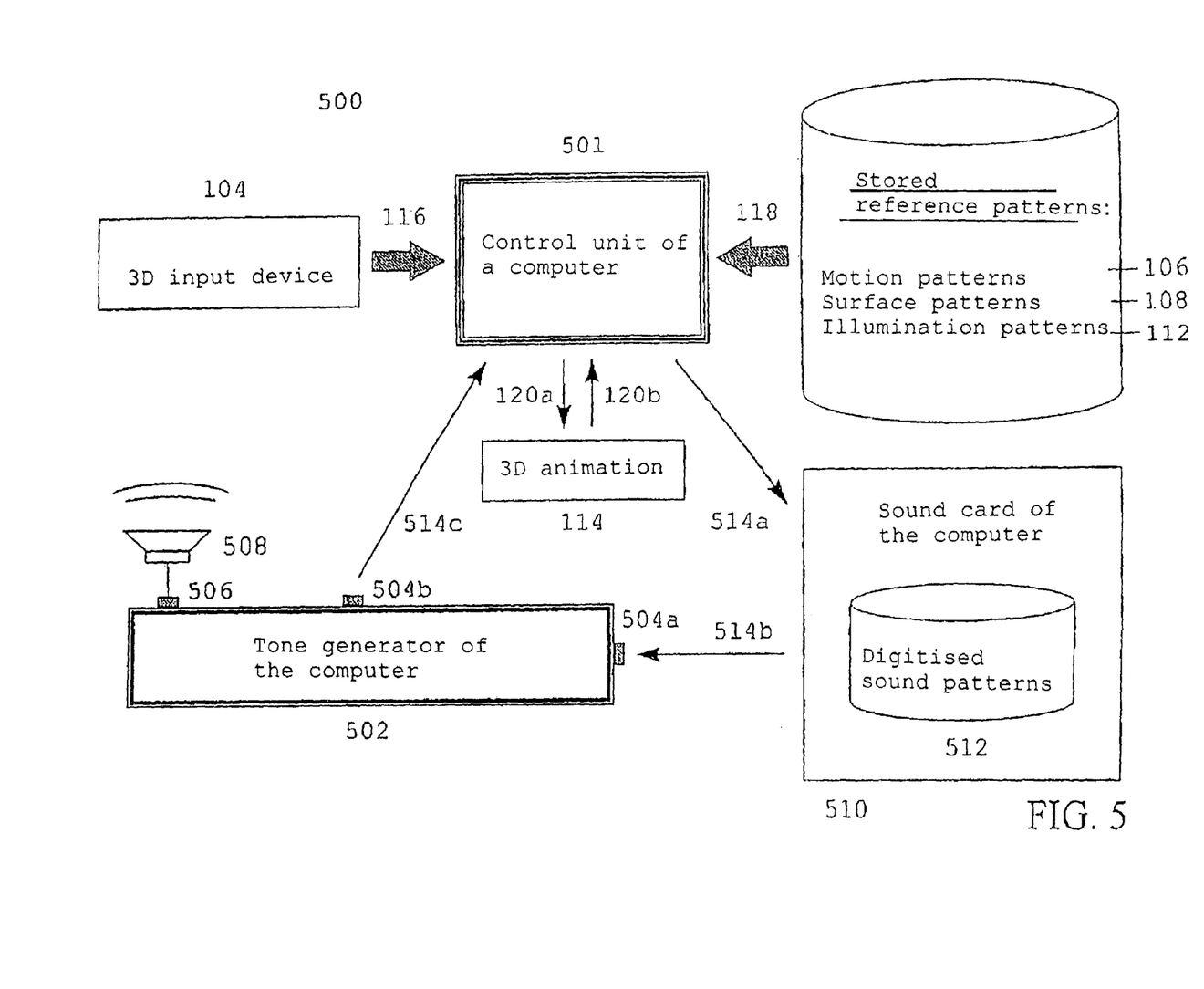

As illustrated in FIG. 5, as an alternative to the control of individual or several acoustic parameters of digitised sound patterns 512, according to one variation of this exemplary embodiment of the underlying invention a process or a system may be provided which uses the following devices:
a computer, the control unit 501 of which is connected to at least one sound card 510 and also to at least one tone generator 502 and
an input device 104 for the input of parametrised control signals 116 for real-time motion control of virtual objects which can be represented on a screen.

In this case the digitised sound patterns 512 can be stored digitally in the memory of at least one sound card 510 of the computer and generated and played back on at least one tone generator 502 of the same computer. Individual or several acoustic parameters of the digitally stored sound patterns 512 may, according to the invention, be generated or influenced in real time by means of control of the virtual objects by a movement of the input device 104.

The controllable virtual objects, which are controlled for the purpose of generating or influencing individual or several acoustic parameters of the digitally stored sound patterns 410 or 512 by a movement of the input device 104, may be, for example, the control elements, keys, switches, knobs and/or sliding controls of a virtual mixing console, with the aid of which, for example, individual frequency ranges of the overtone spectrum of a stored, digitised sound pattern 410 or 512 can be selectively attenuated or amplified.

The input device 104 may be, for example, a wireless control medium which can be moved in three dimensions ("3D mouse") and which is capable of processing simultaneously parametrised control signals 116 of movements in at least six independent degrees of freedom in real time.

The controlled acoustic parameters of a particular digitised sound pattern 410 or 512 may be, for example, pitches, note-values or rest-values, loudness-levels, tempi, articulation instructions, timbres, pedal effects, vibrato effects, chorus effects, echo effects, overtone effects and/or other special effects.

In this connection, parametrised control signals 116 of movements of the input device 104 can be input in three translatory and three rotatory degrees of freedom. Furthermore, in accordance with the invention there may be provision that time derivatives of the parametrised control signals 116 can also be ascertained and processed. The assignment of parametrised control signals 116 each having one degree of freedom to one or more parameters of a particular digitised sound pattern 410 or 512 is, according to the invention, freely specifiable. Optionally, the time derivatives of the parametrised control signals 116 can also be assigned to one or more parameters of a particular digitised sound pattern 410 or 512. The coupling parameters of the assignment of parametrised control signals 116 can likewise be freely specified.

The meanings of the symbols provided with reference codes in FIGS. 1 to 5 can be gathered from the appended list of reference codes.

LIST OF REFERENCE CODES

| No. | Symbol |
|---|---|
| 100 | simplified block diagram for illustrating the input and output signals of the freely specifiable real-time control system 102 for animated graphics, video sequences and/or audio sequences according to the preferred exemplary embodiment of the underlying invention |
| 102 | freely specifiable real-time control system for animated graphics, video sequences and/or audio sequences |
| 104 | 3D input device for input of the control signals 116 |
| 106 | parametrised motion patterns for articulated objects |
| 108 | parametrised surface patterns (geometries, textures) for articulated objects |
| 110 | parametrised sound patterns |
| 112 | parametrised illumination patterns for articulated objects and the background of virtual scenes |
| 114 | 3D animation, displayed on computer screen |
| 116 | control signals from the 3D input device 104 for the freely specifiable real-time control system 102 for animated graphics, video sequences and/or audio sequences |
| 118 | transfer of the parametrised motion patterns 106, surface patterns 108, sound patterns 110 and/or illumination patterns 112 as reference patterns to the corresponding generators 204, 206, 208 and 210 in the freely specifiable real-time control system 102 for animated graphics, video sequences and/or audio sequences |
| 120 | animation output signals from the real-time control system 102 for animated graphics, video sequences and/or audio sequences for the 3D animation 114 |
| 120a | animation output signals from the control unit 401 of a computer for the 3D animation 114 |
| 120b | status signals from the 3D animation 114 for the control unit 401 of the computer |
| 200 | detailed block diagram for illustrating the components and also the input and output signals of the freely specifiable real-time control system 102 for animated graphics, video sequences and/or audio sequences |
| 202 | free-specification module for assigning the control signals or the time derivatives thereof as parameter values for the parametrised motion patterns 106, surface patterns 108, sound patterns 110 or illumination patterns 112 |
| 204 | motion generator for computing the skeletal amendment data of articulated objects on the basis of the control signals 116 as parameter values and at least one, in each instance, parametrised motion pattern 106, whereby the skeletal amendment data reproduce translatory and/or rotatory amendments to the position and/or orientation of the articulated objects |
| 206 | surface generator for computing the surface of virtual articulated objects on the basis of their skeletal amendment data and at least one, in each instance, one surface pattern 108 |
| 208 | acoustic generator for generating tone sequences, starting from parametrised sound patterns 110 |

-continued

| No. | Symbol |
|---|---|
| 210 | illumination generator for generating illumination output signals, starting from parametrised illumination patterns 112 |
| 212 | motion control signals from the free-specification module 202 to the motion generator 204 |
| 214 | surface control signals from the free-specification module 202 to the surface generator 206 |
| 216 | sound control signals from the free-specification module 202 for the acoustic generator 208 |
| 218 | illumination control signals from the free-specification module 202 to the illumination generator 210 |
| 220 | motion animation output signals from the motion generator 204 to the surface generator 206 |
| 222 | surface output signals from the surface generator 206 |
| 224 | sound output signals from the acoustic generator 208 as part of the animation output signals 120 |
| 226 | illumination output signals from the illumination generator 210 |
| 300 | flow chart for illustrating the actions carried out by the freely specifiable real-time control system 102 for animated graphics, video sequences and/or audio sequences |
| 301a | start of set-up phase (= preparation for a real-time animation) |
| 301b | presets, initialisations and allocations for the free-specification module 202 |
| 301c | parameter preset (e.g. attenuation or amplification) |
| 301d | end of set-up phase |
| 302 | start of control phase (= start of a real-time animation) |
| 304 | input of the control signals |
| 306 | evaluation of the control signals |
| 308 | allocation of the control signals |
| 310 | generation of motion data or influencing of motion patterns 106 with the aid of the animation output signals 120 |
| 312 | generation of surface data or influencing of surface patterns 108 with the aid of the animation output signals 120 |
| 314 | generation of sound data or influencing of sound patterns 110 with the aid of the animation output signals 120 |
| 316 | generation of illumination data or influencing of illumination patterns 112 with the aid of the animation output signals 120 |
| 400 | block diagram for illustrating the control of individual or several acoustic parameters of digitised sound patterns by a system consisting of a computer, the control unit 401 of which is conductively connected to at least one electronic musical instrument 402 via a MIDI interface, and a 3D input device 104 for input of parametrised control signals for the real-time motion control of virtual objects which can be represented on a screen |
| 401 | control unit of a computer |
| 402 | master keyboard or synthesiser according to the MIDI standard (here: keyboard with 73 keys, i.e. with a compass of six octaves) |
| 404a | MIDI/IN port (input socket) of the master keyboard or synthesiser 402 |
| 404b | MIDI/OUT port (output socket) of the master keyboard or synthesiser 402 |
| 406 | loudspeaker connecting socket of the master keyboard or synthesiser 402 |
| 408 | loudspeaker |
| 410 | memory of the master keyboard or synthesiser 402 in which a database comprising digitised sound patterns is stored |
| 412a | MIDI/IN signal from the control unit 401 of the computer to the master keyboard or synthesiser 402 |
| 412b | MIDI/OUT signal from the master keyboard or synthesiser 402 to the control unit 401 of the computer |
| 414 | transfer of the digitised sound patterns 410 as reference patterns to the master keyboard or the synthesiser 402 |

| No. | Symbol |
|---|---|
| 500 | block diagram for illustrating the control of individual or several acoustic parameters of digitised sound patterns by a system consisting of a computer, which is provided with an electronic tone generator 502 and a sound card 510, and a 3D input device 104 for input of parametrised control signals for the real-time motion control of virtual objects which can be represented on a screen |
| 501 | control unit of the computer which is provided with an electronic tone generator 502 and a sound card 510 |
| 502 | electronic tone generator of the computer according to the MIDI standard |
| 504a | MIDI/IN signal input of the electronic tone generator |
| 504b | MIDI/OUT signal output of the electronic tone generator |
| 506 | loudspeaker connecting socket of the computer |
| 508 | loudspeaker |
| 510 | sound card of the computer |
| 512 | memory of the sound card 510, in which a database comprising digitised sound patterns is stored |
| 514a | parametrised MIDI control signals from the control unit 501 of the computer to the sound card 510 |
| 514b | MIDI/IN signal from the sound card 510 to the electronic tone generator 502 |
| 514c | MIDI/OUT signal from the electronic tone generator 502 to the control unit 501 of the computer |

The invention claimed is:

1. A process for real-time motion control of an articulated object, comprising the steps of:
   a) defining at least one motion pattern for the articulated object, wherein the motion pattern includes a manipulation of a plurality of articulations controlled by a single input signal,
   b) defining at least one surface pattern for the articulated object,
   c) inputting analog control signals by means of an analog input device, whereby the analog control signals correspond to real-time translational or rotational manipulation by a user of the analog input device,
   d) assigning the analog control signals to motion patterns or surface patterns freely specified by the user,
   e) computing skeletal amendment data on the basis of the analog control signals as parameter values and also on the basis of the at least one motion pattern, whereby the skeletal amendment data reproduce translational amendments to the position or rotational amendments to the orientation of articulations of the articulated object, and
   f) computing the surface of the articulated object on the basis of the skeletal amendment data and on the basis of the at least one surface pattern, wherein
   steps c), d), e), and f) are repeated cyclically, in order to obtain a real-time motion control of the articulated object in a manner dependent on the analog control signals.

2. Process according to claim 1, wherein sound signals are generated by connecting stored digital sound patterns as parameters with the analog control signals.

3. Process according to one of the preceding claims, wherein time derivatives of the analog control signals are ascertained and processed.

4. Process according to claim 3, wherein the assignment of the analog control signals or their derivatives to the motion patterns, surface patterns, or sound patterns is freely specified by the user.

5. Process according to claim 3, wherein illumination patterns as parameters are saved and used for generating illumination effects by means of appropriate connections with the analog control signals.

6. A computer-software product, characterised in that it implements a process according to claim 1 when it is loaded in a memory of a computer.

7. A system for real-time motion control of virtual or real articulated objects, comprising:
   a memory for saving at least one motion pattern and at least one surface pattern of an articulated object, wherein the motion pattern includes a manipulation of a plurality of articulations controlled by a single input signal,
   an analog input device for inputting analog control signals for real-time motion control, whereby the analog control signals correspond to real-time translational or rotational manipulation by a user of the analog input device,
   a controller for assigning the analog control signals to motion patterns or surface patterns freely specified by the user,
   a motion generator for computing skeletal amendment data on the basis of the analog control signals as parameter values and on the basis of the at least one motion pattern, whereby the skeletal amendment data reproduce translational amendments to the position or rotational amendments to the orientation of articulations of the articulated object, and
   a surface generator for computing the surface of the articulated object on the basis of the skeletal amendment data and the at least one surface pattern.

8. System according to claim 7, further comprising a sound generator for generating sound signals by connecting at least one digital sound pattern as a parameter with the analog control signals.

9. System according to one of claims 7 or 8, further comprising a free-specification module for ascertaining and processing time derivatives of the analog control signals.

10. System according to claim 9, wherein the assignment of the analog control signals or their derivatives to the motion pattern, surface pattern, or sound pattern is freely specified by the user.

* * * * *